United States Patent [19]

Harter et al.

[11] 4,456,418
[45] Jun. 26, 1984

[54] DEVICE FOR TAKING UP, ALIGNING AND TRANSFERRING A PALLET OR SIMILAR ARTICLE

[75] Inventors: Walter Harter, Hayingen; Karl Schumacher, Tübingen, both of Fed. Rep. of Germany

[73] Assignee: Ernst Wagner KG-Fördertechnik, Fed. Rep. of Germany

[21] Appl. No.: 369,104

[22] Filed: Apr. 16, 1982

[30] Foreign Application Priority Data

Apr. 18, 1981 [DE] Fed. Rep. of Germany ....... 3115775

[51] Int. Cl.³ .............................................. B65G 47/24
[52] U.S. Cl. .................................... 414/351; 29/33 P; 193/35 C; 414/222
[58] Field of Search ............... 414/222, 281, 349, 351, 414/28; 198/339, 345, 472, 785; 193/35 C; 29/33 P

[56] References Cited

U.S. PATENT DOCUMENTS 4,239,445 12/1980 Ozawa ............................. 198/345 X
4,324,027 4/1982 Burkhardt et al. ............. 198/472 X

*Primary Examiner*—Robert G. Sheridan
*Attorney, Agent, or Firm*—McGlew and Tuttle

[57] ABSTRACT

A device for aligning a pallet or similar article both horizontally and vertically to facilitate a transfer to a support located at a predetermined horizontal position and height comprises first and second banks of engagement rollers which have axes disposed substantially horizontally and which are movable toward and away respective opposite sides of the pallet to engage the pallet underside from each side. In addition, the apparatus includes a vertical alignment member in the form of first and second banks of rollers which extend obliquely and are movable in an oblique plane toward and away from the respective sides of the pallet to engage it at a selected vertical height. The surfaces of the horizontal aligning rollers and vertical aligning rollers engage and support the pallet at a selected intersecting vertical and horizontal plates along its side. The vertical aligning rollers which extend obliquely are advantageously offset from the rollers which have axes which extend horizontally. The aligning rollers are mounted on a cross beam supported on two sets of posts which itself may be movable backwardly and forwardly in a horizontal direction at the top of the posts. The horizontal rollers are journalled for axial displacement in the cross beams and the obliquely extending rollers are mounted for axial shiftable movement on brackets which are also advantageously mounted so that they may be pivoted on the cross beams.

14 Claims, 2 Drawing Figures

DEVICE FOR TAKING UP, ALIGNING AND TRANSFERRING A PALLET OR SIMILAR ARTICLE

FIELD AND BACKGROUND OF THE INVENTION

This invention relates in general to positioning devices and in particular to a new and useful device for aligning a pallet or similar article both horizontally and vertically to facilitate its transfer to a support of predetermined height and lateral position.

In most instances of application, a movable supporting frame, particularly of a railless industrial truck, can be aligned with a take-up or delivery station with a satisfactory accuracy. However, in some cases, a still more accurate positioning of the supporting frame during the transfer to a second supporting structure is required. Such a necessity may arise, for example, if the object to be taken up and transferred is a work holding pallet and the second support is the table of a machine tool. Work holding pallets are very expensive fixtures which are machined with such accuracy that upon an exact alignment with the table of a machine tool, the slideways of the pallet can be engaged with the guides of the machine tool table.

SUMMARY OF THE INVENTION

The invention is directed to a device permitting the accurate alignment of a supporting frame.

In accordance with the invention the device for aligning a pallet both horizontally and vertically to facilitate the transfer of the pallet from the first position, for example, on a fork lift truck onto a support of predetermined height and lateral position, for example a machine base comprises longitudinally spaced support posts arranged in respective sides of a guideway through which a lift truck such as a railless truck is movable. The support posts carry cross beams which extend across the truck passageway. A plurality of rollers which are rotatable about a horizontal axis are mounted on the cross posts for movement toward and away from respective sides of the pallet to be received thereon. In addition, rollers are mounted on the cross beams by brackets to hold them obliquely and they may be adjustably moved in the oblique plane in which they are held to engage respective opposite sides of the pallet at a selected vertical height. The adjustment of the horizontal rollers and the oblique rollers is such that they engage the pallet at selected vertical and horizontal position at the respective side edges of the pallet.

With the aid of the movable first support, the pallet or the like is transferred to the mechanism for vertical and horizontal alignment by which it is automatically aligned relative to the second support whither it can then be transferred by a suitable device or even by hand. The mechanism for vertical and horizontal alignment must be designed to ensure that the pallet will remain until the transfer to the second support is securely accomplished. This implies that the pallet must be moved in an accurate transitional motion which must be maintained up to reaching the final position on the machine.

In accordance with a feature of the invention, the aligning mechanisms in the form of the horizontal aligning rollers and the obliquely extending rollers engage the lower edge of the pallet and they are moved to hold the pallet at a selected height and lateral position during its transfer from a support which is a lift truck to a second support. Engagement members are advantageously rotatable rollers comprising two or more rollers arranged on each side of the pallet which engage it horizontally and two or more rollers which are arranged obliquely which engage the pallet at spaced locations along its length in an oblique plane.

Therefore, the longitudinal edges of the pallet must be of lasting strength and machined very accurately. On the other hand of course, the mechanism for alignment must be designed so as to best avoid damages to these edges. After the alignment, the pallet and the work carried thereon rest on the aligning mechanism preferably not by their longitudinal edges alone, but also by the adjacent portions of the pallet. Advantageously, the adjacent portions are the spaced or continuous base surface portions of the pallet, limited on one side by the longitudinal edges.

If roller banks are provided, the supporting faces are of course determined by the respective surface lines of the individual rollers. As compared to slideways, roller banks have the advantage of best preventing damages to the pallet surfaces or edges. That is, a rolling friction will always be preferred to a sliding friction.

In a preferred arrangement of the invention, the horizontal aligning mechanism or members comprise a bank of rollers which are disposed horizontally and rotate about horizontal axes and the vertical alignment members comprise a bank of rollers which are disposed obliquely at an angle to the horizontal rollers and which are shiftable along the oblique plane. The rollers of the respective banks are advantageously offset. In a preferred arrangement, the horizontal alignment mechanism comprises a separate roller bank on each side of the pallet, preferably made up of two or more rollers. The vertical adjusting members advantageously comprise a bank of obliquely extending rollers which engage the pallet from respective sides at an angle which is more than 90° from the horizontal.

The axes of rotation of the rollers thus extend perpendicularly to the direction in which the pallet moves. Basically, slide bolts with a circularly cylindrical or other cross section may also be employed instead of rollers, however, rollers will be preferred for the above mentioned reasons.

As in the instances above, in this mechanism for horizontal alignment again, rollers will be preferred to bolts or similar elements to form the upper slideway. The axes of rotation of the inclined rollers also extend at right angles to the direction of motion of the pallet, etc. Therefore, considered in cross section, the planes of the roller banks of the mechanism for vertical and horizontal alignment form a trapezoidal, upwardly open channel into which the pallet, etc. is lowered from above. Should it happen that while contacting the four banks or slideways, the pallet is in a canted position, the slants in connection with the own weight of the pallet will cause the pallet to automatically align in both the horizontal and vertical directions. Since after this alignment, the longitudinal edges of the pallet so to speak coincide with the longitudinal edges of the mentioned channel, a longitudinal guidance during the transfer to the second support is insured. Only a transitional motion is needed which must be exactly parallel to the mentioned longitudinal edges.

In a preferred arrangement the inclined rollers or the obliquely extending rollers are located in the free spaces between the individual rollers of the bank of horizontally adjusting rollers. Since they are inclined position, the rollers must project between the horizontal ones at least to the indicated extent, to ensure that their surface lines reach the plane defined by the surface lines of the horizontal rollers, or preferably, extend even somewhat lower.

Advantageously the plane of one inclined roller bank or the obliquely extending rollers of the vertically adjusting mechanism forms an angle with the horizontal rollers of greater than 90°. The individual rollers of both the horizontal and vertical adjustment members are advantageously axial displaceable. For this purpose they are mounted by means of so called ball bushings which permit them to be slide axially on these ball bushings. A return device such as a biasing spring acts against the rollers to shift them back to a neutral position, for example. The mechanisms for adjusting vertical and horizontal alignment affect the movement of the rollers into predetermined horizontal and oblique positions to hold them in these positions. The rollers are advantageously supported on cross beams so that they project out from the cross beams toward the pallet in a cantilever support fashion.

The pallets or other articles to be aligned are advantageously carried by a railless truck which moves in a path between banks of rollers which effect the vertical and horizontal alignment. The apparatus includes shifting mechanism on the truck which permits the positioning of the pallet between the banks of rollers and a mechanism for engaging the pallet and pulling it off the rollers onto the second support when desired.

In the inventive arrangement a sliding friction during alignment of the pallet is not necessary in view of the fact that the rollers are provided for giving support. A tilted or laterally offset pallet becomes aligned by the aligning device and was maintained in alignment during its transfer to the second support. The rollers are advantageously mounted by means of ball bushings so that all this rolling friction is established between the parts. A spring return device for moving the rollers back to an initial position or a neutral position provides an effective means for returning the rollers for engagement with the next pallet. Rollers of the separate banks may be adjusted separately as necessary or desired. The rollers are advantageously mounted on supporting frames which may be assembled to a unit by means of a common base plate and thus passage for a movement truck is provided therebetween. The pallet itself is advantageously provided with an underside defining a slideway into which a lifting device such as the lift elements of a fork truck are insertable. Preferably the truck includes specially shaped engagement elements which are guided in the slideways of the pallet so that a precise transfer to the second support may be effected.

Accordingly, it is an object of the invention to provide an improved device for aligning the pallet or similar article for transfer to a further support which includes means engaging respective opposite sides to the pallet on both obliquely extending members and horizontally extending members.

A further object of the invention is to provide a device for aligning and moving a pallet which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
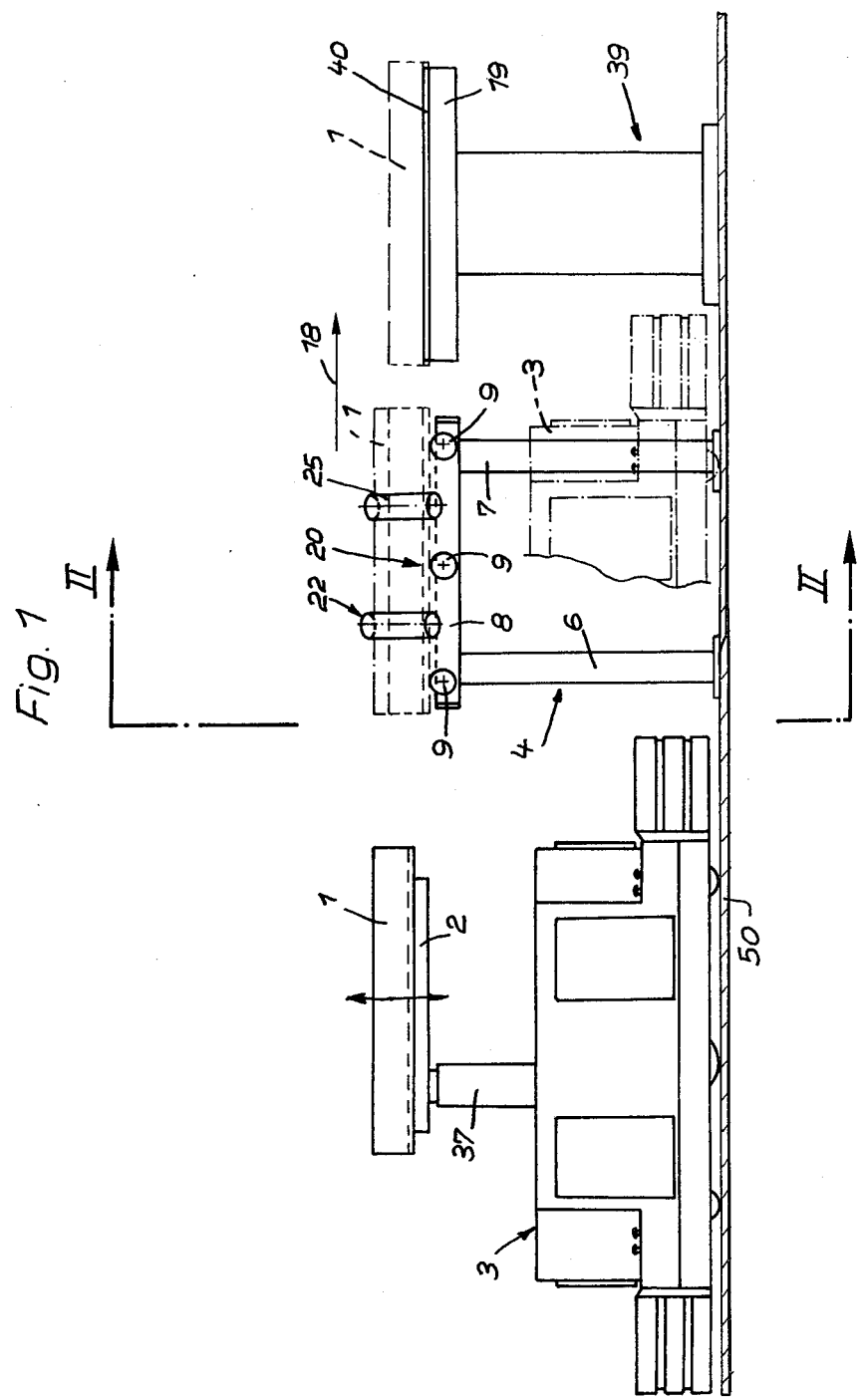
FIG. 1 is a side elevational view of a device for transferring pallets to a fixed support constructed in accordance with the invention.

Referring to the drawings in particular the invention embodied therein comprises a device for aligning a pallet 1 both horizontally and vertically to facilitate the transfer of the pallet 1 onto a support 19 of predetermined height and lateral position. The device comprises vertical alignment members in the form of first and second roller banks 11 and 12 which are mounted on each side of the pallet 1 for movement in the horizontal plane toward and away from the respective sides of the pallet. In addition the vertical alignment mechanism includes first and second obliquely extending members in the form of roller banks 25 and 26 mounted on respective sides of the pallet for movement toward and away from the respective sides of the pallet in an oblique plane which extends at an angle to the axis of the roller banks 11 and 12. The surfaces of the horizontal roller banks 11 and 12 and the oblique roller banks 25 and 26 engage in support of the pallet at selected intersecting vertical and horizontal points.

Figure 2:
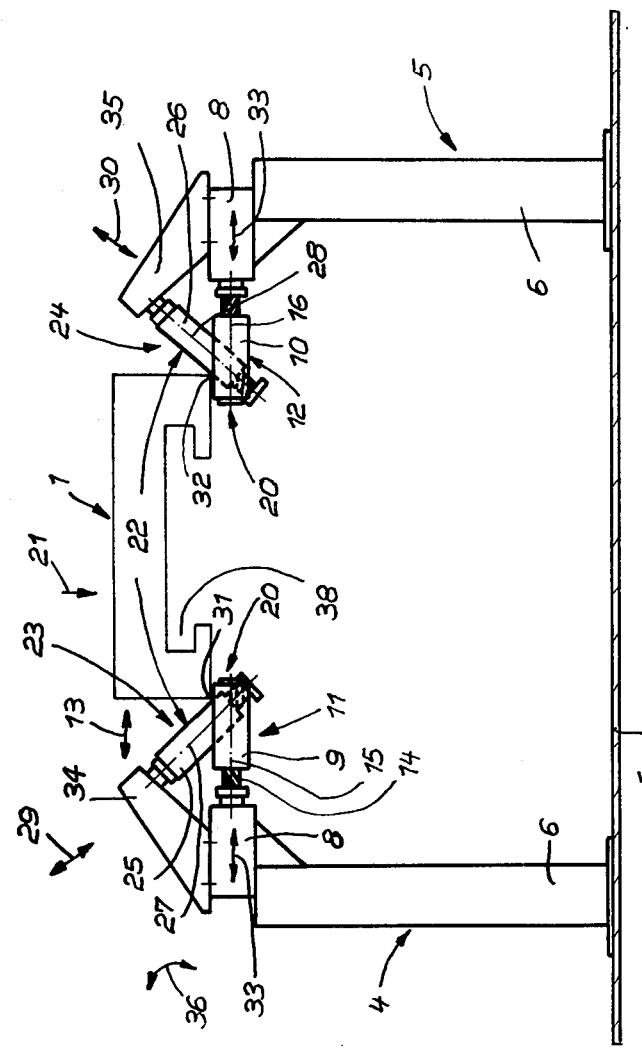
FIG. 2 is a section taken along the line II—II of FIG. 1.

As shown in FIG. 2, a device for taking up a pallet 1 or the like from a movable first support 2, particularly a railless or fork-lift truck 3, preferably comprises a first, for example, left-hand part 4 and a second, right-hand part 5, which parts may be connected to each other for example through a base plate 50.

In the shown embodiment, each part comprises two laterally spaced strong posts 6 and 7 carrying respective cross beams 8 and 8. Each cross beam 8, 8 supports one central and two external or end rollers 9 and 10 respectively, by which a left-hand bank 11 and a right-hand roller 12 are formed. Such a roller bank may also be formed by two, or more than three, rollers of course. Rollers 9 and 10 are mounted for rotation about respective axes 15 and 16 and they are axially (laterally) displaceable as indicated by double arrow 13, by means of ball bushings (not shown). The displacement from the shown initial position is effected against the action of a return mechanism 14, advantageously a spring. Roller axes 15 and 16 extend horizontally and at right angles to the direction 18 (FIG. 1) in which pallet 1 moves during its transfer to a second support 19. The left-hand and right-hand rollers 9 and 10 are coaxial and their free ends face each other. The two roller banks 11, 12 form a mechanism 20 for vertically aligning a pallet 1 which has been lowered in the direction of arrow 21.

The device further comprises a mechanism 22 for aligning pallet 1 horizontally, which is formed similarly by a left-hand inclined roller bank 23 and a right-hand inclined roller bank 24. Each of these roller banks comprises obliquely mounted rollers 25,26 rotatable about axes 27,28. According to FIG. 1, rollers 25 are provided at locations staggered relative to rollers 9 and rollers 26 are staggered relative to rollers 10. Roller axes 27,28 also are at right angles to the transfer direction and they form with each other preferably an angle of about 90°. A plane passing through axes 25 or 28 in the shown embodiment forms with a plane through the axes of the horizontal rollers preferably at angles of about 135°. Rollers 25 and 26 are mounted for axial displacement in the respective directions of double arrows 29 and 30 on ball bushings or similar elements being provided for this purpose. Their displacement is effected against the action of return springs, by which the rollers 25 and 26, in the same way as rollers 9, 10, are held in a mid or end position. For reasons of clarity, the springs are shown only partly.

In FIG. 2, pallet 1 is horizontally and vertically aligned. This means that the longitudinal edges 31 and 32 on the underside of pallet 1, which extend in the transfer direction 18, are positioned exactly in the intersection or corner lines formed by the horizontal and inclined roller banks.

To be able to adapt the device to pallets 1 or the like of various widths, it is advantageous to make the crossbeams 8,8 on which rollers 9 and 10 are mounted, displaceable relative to each other in the direction of double arrows 33, and arrestible in position. This makes inclined rollers 25 and 26 which are mounted thereon through brackets 34,35, also displaceable and arrestible. In addition, or as an alternative, brackets 34,35 may be mounted for pivoting, as indicated by double arrow 36.

Left part 4 and right part 5 of the device equipped with aligning roller banks 20 and 22, form an upwardly open structure into which the railless truck 3 can be moved and which then becomes closed at the top by placing a pallet 1 thereon. While moving the truck in to lower the pallet, the elevating mechanism 37 of the truck passes between the left and right aligning equipments 20 and 22. The truck is driverless and designed as a kind of stacker truck. At the upper end of the elevating mechanism 37 of the truck, a movable supporting plate 2 is mounted, which loosely engages a slideway 38 provided in the lower portion of pallet 1, or it engages the pallet directly from below, and disengages as soon as the pallet is placed on the take-up or aligning device. Then the truck may continue its travel in the initial direction, or return.

Pallet 1 is a so-called work holding pallet, having its slideway 38 designed substantially as a T-slot. A mating cross section is provided as a guide 40 on the second support 19. This support for example, is the table of a machine tool 39. The machine tool is equipped with an extensible pulling mechanism (not shown) such as a hydraulic or pneumatic cylinder by which pallet 1 can be engaged and pulled over from banks 20,22 in the direction of arrow 18, so that guide 40 of support 19 engages slideway 38 of pallet 1. The adjusted lower banks of the take-up device ensure a millimeter accuracy alignment with the machine tool during the transfer.

While specific embodiments of the invention have been shown and described in detail to illustrate the application of the principles of the invention, it will be understood that the invention may be embodied otherwise without departing from such principles.

What is claimed is:

1. A device for aligning a pallet or similar article both horizontally and vertically to facilitate the transfer of the article onto a support of predetermined height and lateral position, comprises first and second vertical alignment means mounted on each side of said article for horizontal movement toward and away the respective sides of the article, and first and second horizontal alignment members which extend obliquely and are mounted on each side of the article for movement toward and away from the respective sides of the article in an oblique plane extending at an angle to the axis of said first and second vertical alignment members, the surfaces of said vertical alignment members and said horizontal alignment members engaging and supporting said pallet at a selected intersecting vertical and horizontal point.

2. A device according to claim 1, wherein said vertical alignment members comprise members which engage the article at its bottom edge.

3. A device according to claim 1, wherein said vertical alignment members comprises a roller bank on each side of the article having supporting surfaces which extend horizontally at the same level as the article, said roller banks comprising rollers arranged in spaced longitudinal locations alongside the article and the rollers of respective banks being of a length such that there is a space remaining between adjacent rollers of opposite banks.

4. A device according to claim 1, wherein said first and second vertical alignment members comprise first and second roller banks each comprising a plurality of longitudinally spaced rollers having horizontally extending axes of rotation with the axes of the corresponding rollers of one bank being aligned with the rollers of the opposite bank, the first roller of each bank being spaced from the last roller of each bank by an amount at least equal to the length of the article.

5. A device according to claim 1, wherein said first and second horizontal alignment obliquely extending members and said first and second vertical alignment members comprise a roller bank on each side of the article, each roller bank providing a plurality of longitudinally spaced rollers, the rollers of said horizontal alignment obliquely extending members being offset from those of said vertical alignment members.

6. A device according to claim 4, wherein said rollers of the horizontal alignment obliquely extending members have a free end facing toward the article which extend between said horizontal rollers and at least to the level of said horizontal rollers.

7. A device according to claim 6, wherein the plane of the oblique roller bank forms with the plane of said horizontal roller bank an angle which is at least 90°.

8. A device according to claim 5, wherein said vertical alignment roller banks and said horizontal alignment roller bank are mounted so that the individual rollers thereof are axially displaceable.

9. A device according to claim 8, including roller ball bushings mounting said rollers for rotation permitting the axial displacement thereof.

10. A device according to claim 8, including spring means acting on said rollers to return them to an end position, said rollers being axially displaceable against the force of said spring.

11. A device according to claim 10, wherein each of said vertical alignment members and said horizontal alignment obliquely extending members are adjustably positionable and arrestible.

12. A device according to claim 1, including a support post arranged on each side of the article at spaced longitudinal locations along the path of movement of the article and a cross beam supported on said support post extending longitudinally on each side of the article, said vertical alignment members and said horizontal alignment obliquely extending members being mounted on respective support posts.

13. A device according to claim 12, wherein said support posts are separated laterally to define a space for the passage of a lift truck therebetween including a lift truck having a lifting mechanism adjusted to be raised and lowered between said post to carry the article to be transferred.

14. A device according to claim 13, wherein said lift truck is railless.

* * * * *